United States Patent
Hasegawa (10) Patent No.: US 7,043,554 B2
(45) Date of Patent: May 9, 2006

(54) NETWORKER SERVER, METHOD FOR CONTROLLING TRANSMISSION OF A HYPERTEXT AND RECORDING MEDIUM STORING A HYPERTEXT

(75) Inventor: Tadashi Hasegawa, Kato (JP)

(73) Assignee: Fujitsu Limited, Kawasaki (JP)

( * ) Notice: Subject to any disclaimer, the term of this patent is extended or adjusted under 35 U.S.C. 154(b) by 964 days.

(21) Appl. No.: 09/812,830

(22) Filed: Mar. 21, 2001

(65) Prior Publication Data

US 2002/0059441 A1 May 16, 2002

(30) Foreign Application Priority Data

Nov. 15, 2000 (JP) .............................. 2000-347471

(51) Int. Cl.
- G06F 15/16 (2006.01)
- G06F 11/30 (2006.01)
- H04L 9/00 (2006.01)

(52) U.S. Cl. ...................... 709/229; 709/217; 713/201; 713/160; 713/161

(58) Field of Classification Search ................ 713/201, 713/200, 160, 161; 370/401; 709/229, 218, 709/225, 217; 345/855
See application file for complete search history.

(56) References Cited

U.S. PATENT DOCUMENTS

| | | | | |
|---|---|---|---|---|
| 5,678,041 A | * | 10/1997 | Baker et al. | 707/9 |
| 6,175,863 B1 | * | 1/2001 | Belfiore et al. | 709/218 |
| 6,240,455 B1 | * | 5/2001 | Kamasaka et al. | 709/229 |
| 6,298,446 B1 | * | 10/2001 | Schreiber et al. | 713/201 |
| 6,363,479 B1 | * | 3/2002 | Godfrey et al. | 713/160 |
| 6,421,781 B1 | * | 7/2002 | Fox et al. | 713/201 |
| 6,442,687 B1 | * | 8/2002 | Savage | 713/156 |
| 6,525,748 B1 | * | 2/2003 | Belfiore et al. | 345/855 |
| 6,539,021 B1 | * | 3/2003 | Kennelly et al. | 370/401 |
| 6,574,617 B1 | * | 6/2003 | Immerman et al. | 707/1 |
| 6,605,120 B1 | * | 8/2003 | Fields et al. | 715/513 |
| 6,697,865 B1 | * | 2/2004 | Howard et al. | 709/229 |
| 6,732,179 B1 | * | 5/2004 | Brown et al. | 709/229 |
| 6,865,679 B1 | * | 3/2005 | Dennison | 713/200 |

* cited by examiner

Primary Examiner—David Wiley
Assistant Examiner—Michael Delgado
(74) Attorney, Agent, or Firm—Staas & Halsey LLP (57) ABSTRACT

A network server, a transmission control method and a recording medium are provided for controlling an access to an information resource easily and flexibly. A WWW server has transmission control means for controlling transmission of a hypertext. The hypertext includes an access permission information concerning permission of the access to the hypertext. The transmission control means control the transmission of the hypertext to a terminal device in accordance with the access permission information when the terminal device requests for the access to the hypertext.

6 Claims, 10 Drawing Sheets

```
<HTML>
<HEAD>
<meta access deny zzzzz.co.jp>  ← TG
</HEAD>
<BODY>
        ⋮
</BODY>
</HTML>
```
HT (B)

```
<HTML>
<HEAD>
<meta access passwd John,7s#Q1 >  ← TG
</HEAD>
<BODY>
        ⋮
</BODY>
</HTML>
```
HT

Fig.5

DAB

```
<HTML>
<HEAD>
<meta access allow xxxxx.co.jp>       ← TG
<meta access deny zzzzz.co.jp>        ← TG
<meta access passwd John,7s#Q1 >      ← TG
</HEAD>
<BODY>
       ⋮
</BODY>
</HTML>
```
HT (B)

```
<HTML>
<HEAD>
<meta access allow zzzzz.co.jp & passwd John,7s#Q1>  ← TG
<meta access allow xxxxx.co.jp>       ← TG
</HEAD>
<BODY>
       ⋮
</BODY>
</HTML>
```
HT

NETWORKER SERVER, METHOD FOR CONTROLLING TRANSMISSION OF A HYPERTEXT AND RECORDING MEDIUM STORING A HYPERTEXT

CROSS-REFERENCE TO RELATED APPLICATIONS

This application claims the priority of Japanese Patent Application No. 2000-347471 filed on Nov. 15, 2000 in the Japanese Patent Office, the disclosure of which is incorporated herein in its entirety by reference.

BACKGROUND OF THE INVENTION

1. Field of the Invention

The present invention relates to a network server such as a WWW server for transmitting a hypertext that is written in a language such as HTML or XML, and a transmission control method of a hypertext, and a recording medium storing a hypertext.

2. Description of the Related Art

Figure 10:
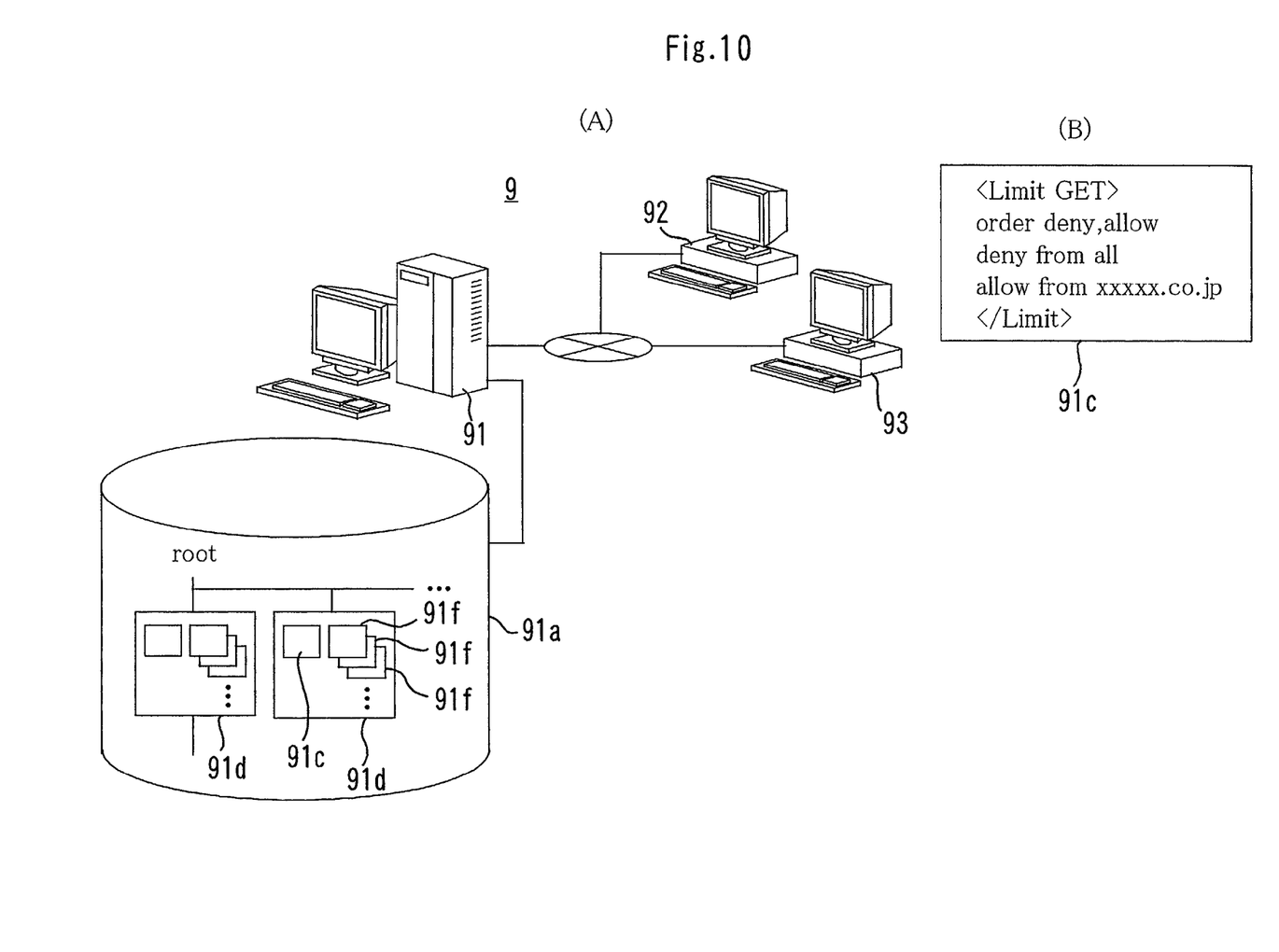
FIGS. 10A and 10B are diagrams showing a conventional WWW system.

FIGS. 10A and 10B are diagrams showing a conventional WWW system 9.

Conventionally, a WWW system is widely used as a system for accessing an information resource that is distributed on the Internet.

The WWW system comprises a WWW server for managing the information resource to be provided for a user, a client having a WWW browsing function for accessing thereto, a HTTP placed on a layer upper than the TCP/IP as a communication protocol, and other various devices or software.

The information resource is provided as a hypertext file that is written in a language such as HTML or XML (Extensible Markup Language).

A user inputs and designates a URL of the hypertext that is desired to be accessed in the WWW browser of the client. The WWW browser requests the WWW server to access the hypertext, so as to download the hypertext from the WWW server to the client.

For example, if the HTTP is used as a communication protocol, the URL designating a hypertext "top.html" on a server "WWW.xxxxx.co.jp" is expressed as "http://WWW.xxxxx.co.jp/top.html."

The WWW system is used not only in the Internet but also in a LAN or an intranet connecting a plurality of LANs.

Many users use the Internet. One object of the Internet is to share information resources among many users in the world. Theoretically, any client on the Internet can access to a hypertext on a WWW server.

However, recent usage of the Internet has become increasingly diversified. There is a need for controlling access to a hypertext so that only specific users are permitted to access.

Some methods are proposed for controlling an access.

One method is establishing a firewall using a proxy server or the like. For example, a firewall is established between an intra-company network and the Internet, so as to control the communication between them. By using the firewall, only specific users are permitted to access the Internet from the intra-company network, or an access using a specific communication protocol is prohibited as an access control.

Another method provides an access control file as shown in FIG. 10B in the directory where the hypertext is placed.

The WWW system 9 shown in FIG. 10A is on the Internet and comprises a WWW server 91 and clients 92 and 93.

The WWW server 91 includes a magnetic recording device 91a, in which a hypertext 91f is recorded as an information resource. The hypertext 91f in the magnetic recording device 91a is managed by a directory structure, and one directory 91d includes an access control file 91c in which information about an access control to the plural hypertexts 91f and the directories 91d thereof is described.

The clients 92 and 93 can access to the Internet by a WWW browser. As an example, the client 92 belongs to a domain "xxxxx.co.jp," and the client 93 belongs to a domain "zzzzz.co.jp."

A user inputs a URL of the hypertext 91f in the WWW browser of the client 92 or 93, so as to request for an access to the hypertext 91f. This request is transmitted to the WWW server 91.

The WWW server 91 refers to the access control file 91c that is in the directory 91d where the hypertext 91f is placed and decides whether the hypertext 91f should be transmitted to the client that has made the request.

The access control file 91c shown in FIG. 10B has contents indicating allowing an access from the domain "xxxxx.co.jp" and denying any access from other domains. Therefore, in this case, an access is allowed responding to a request from the client 92, and the hypertext 91f is transmitted to the client 92. On the contrary, an access is denied responding to a request from the client 93, and a message indicating the access denial is transmitted to the client 93.

However, with the above-mentioned access control using the firewall, only an administrator can set the access control and advanced knowledge is required for the setting. If the setting is misused, the security of the entire system can be deteriorated. In addition, it is difficult to set the access control for each file. Therefore, the method using a firewall is not suitable for precise access control.

A method of providing an access control file 91c can control an access for each directory, so it is often used by a service provider of the Internet who provides many users (who open a Web site and offer information resources such as Web contents) with a service. The Internet service provider gives a directory to each information provider. Each information provider stores a hypertext 91f as an information resource in his or her directory, so that many users on the Internet can share the hypertext 91f.

Since one access control file 91c is placed in one directory 91d, a uniform access control is performed for all hypertexts 91f in the directory 91d. Therefore, if a different setting of the access control is desired for each hypertext 91f, a directory 91d should be provided for each hypertext 91f.

However, a directory is used for making classification of files be easily understood for an administrator in accordance with kinds or contents of the file. The usage of the directory for the access control may complicate the file management. In addition, if the URL of the hypertext 91f is changed whenever the setting of the access control is changed in the WWW server 91, it may be inconvenient for the user of the client side to access to the hypertext 91f.

Furthermore, since the access control file 91c depends on software that is used in the WWW server 91 for the access control, it is necessary to understand grammar and rules of the language used in the software for making the access control file 91c. Otherwise, the access control file 91c that is written incorrectly may cause a wrong access control or may deteriorate the security of the entire WWW server 91.

For this reason, many service providers of the Internet prohibit the access control file 91c from being placed on the directory, or use software that ignores the presence of the access control file 91c.

Therefore, it is difficult to control the access for each information resource by any of the above-mentioned methods.

SUMMARY OF THE INVENTION

An object of the present invention is to provide a network server, a transmission control method and a recording medium for performing an easy and flexible access control to information resources.

A network server according to one aspect of the present invention comprises transmission control means for controlling transmission of a hypertext. The hypertext includes access permission information that is information concerning permission of an access to the hypertext. The transmission control means controls transmission of the hypertext to a client in accordance with the access permission information when the client requests for the access to the hypertext.

Preferably, when transmitting the hypertext, the transmission control means generate a hypertext in which the access permission information is deleted and send the same.

A method for controlling transmission of a hypertext according to another aspect of the present invention is used in a network system including a network server for transmitting the hypertext and a client capable of accessing to the network server. The hypertext includes a description of access permission information that is information concerning permission of an access to the hypertext. The method comprises deciding whether the hypertext should be transmitted to the client in accordance with the access permission information of the hypertext when the client requests the network server for the access to the hypertext, and transmitting the hypertext when it is decided that the hypertext should be transmitted.

Preferably, when transmitting the hypertext, a hypertext in which the access permission information is deleted is generated to be transmitted.

The recording medium storing the hypertext is a computer-readable recording medium storing a hypertext in which access permission information concerning permission of an access is described

DETAILED DESCRIPTION OF THE PREFERRED EMBODIMENTS

Hereinafter, the present invention will be explained more in detail with reference to embodiments and drawings.

Figure 1:
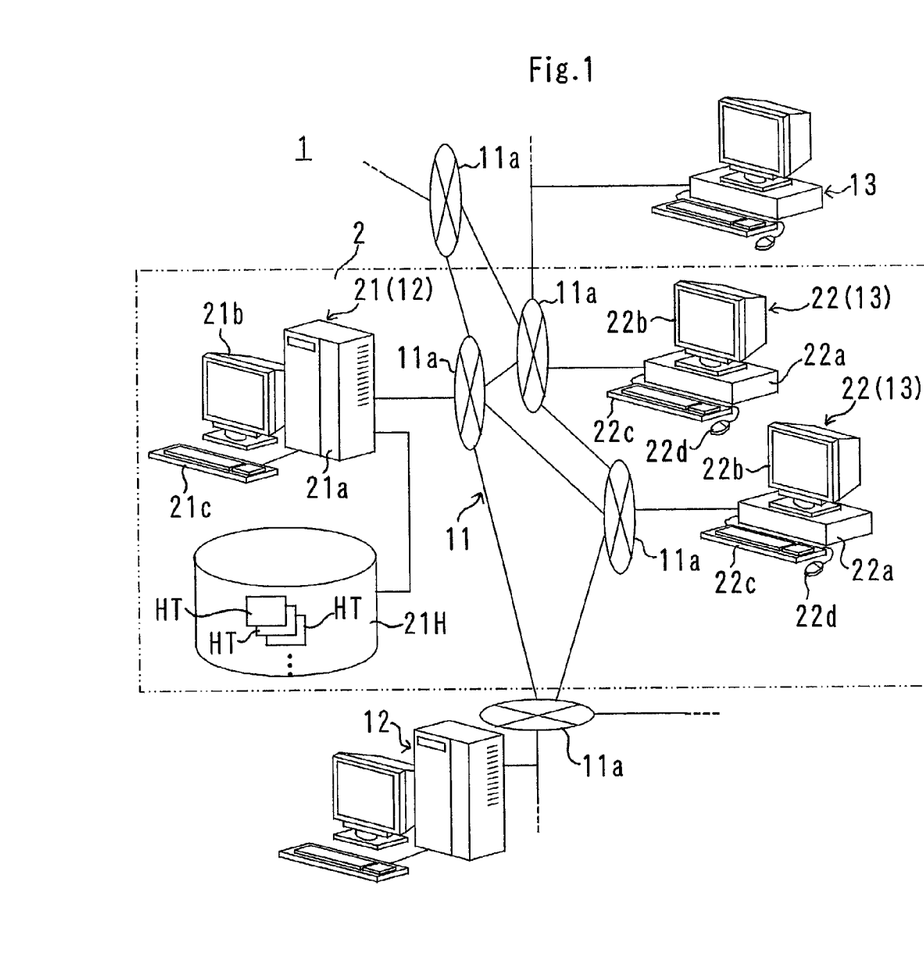
FIG. 1 is a diagram explaining the Internet and a WWW system.
Figure 2:
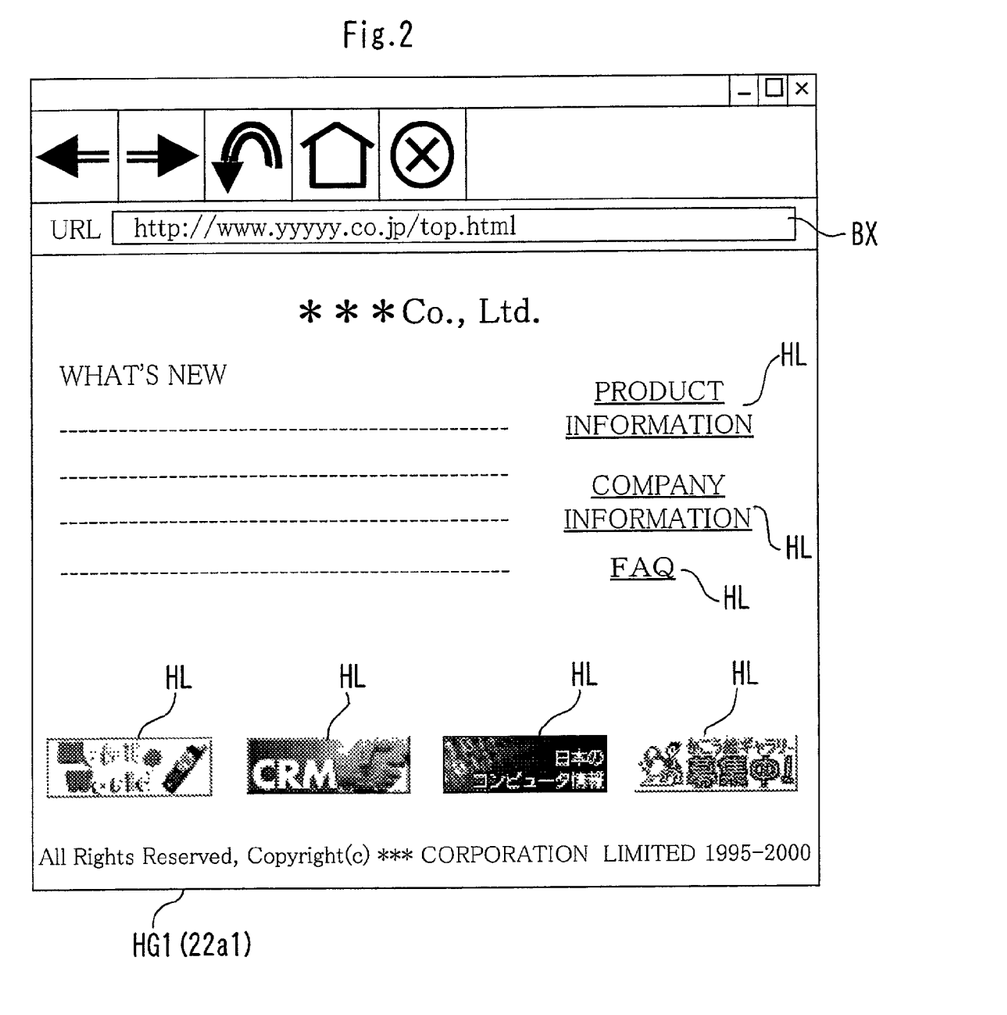
FIG. 2 is a diagram showing a screen of a WWW browser.
Figure 3:
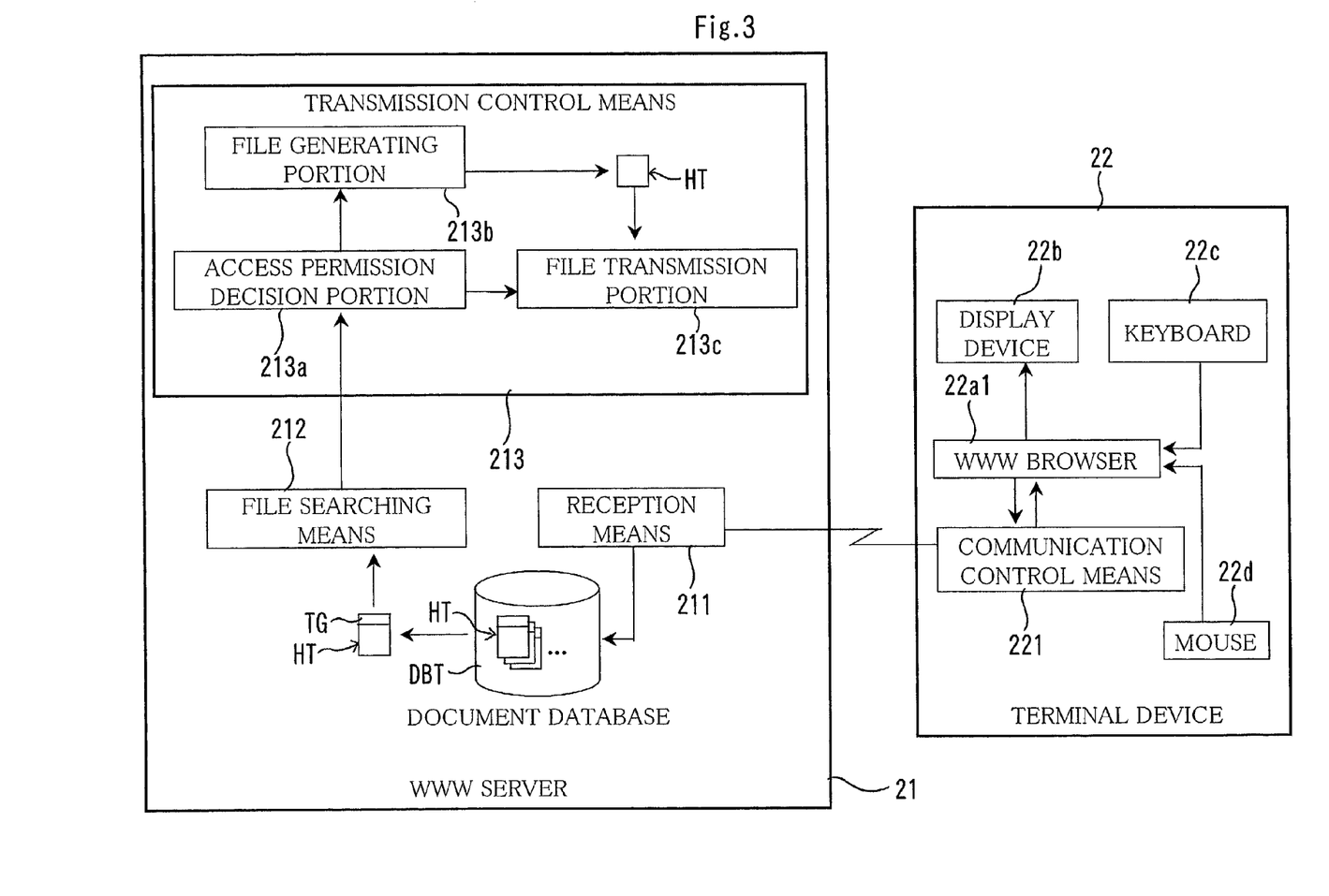
FIG. 3 is a block diagram showing a functional structure of a WWW server and a terminal device.
Figure 4:
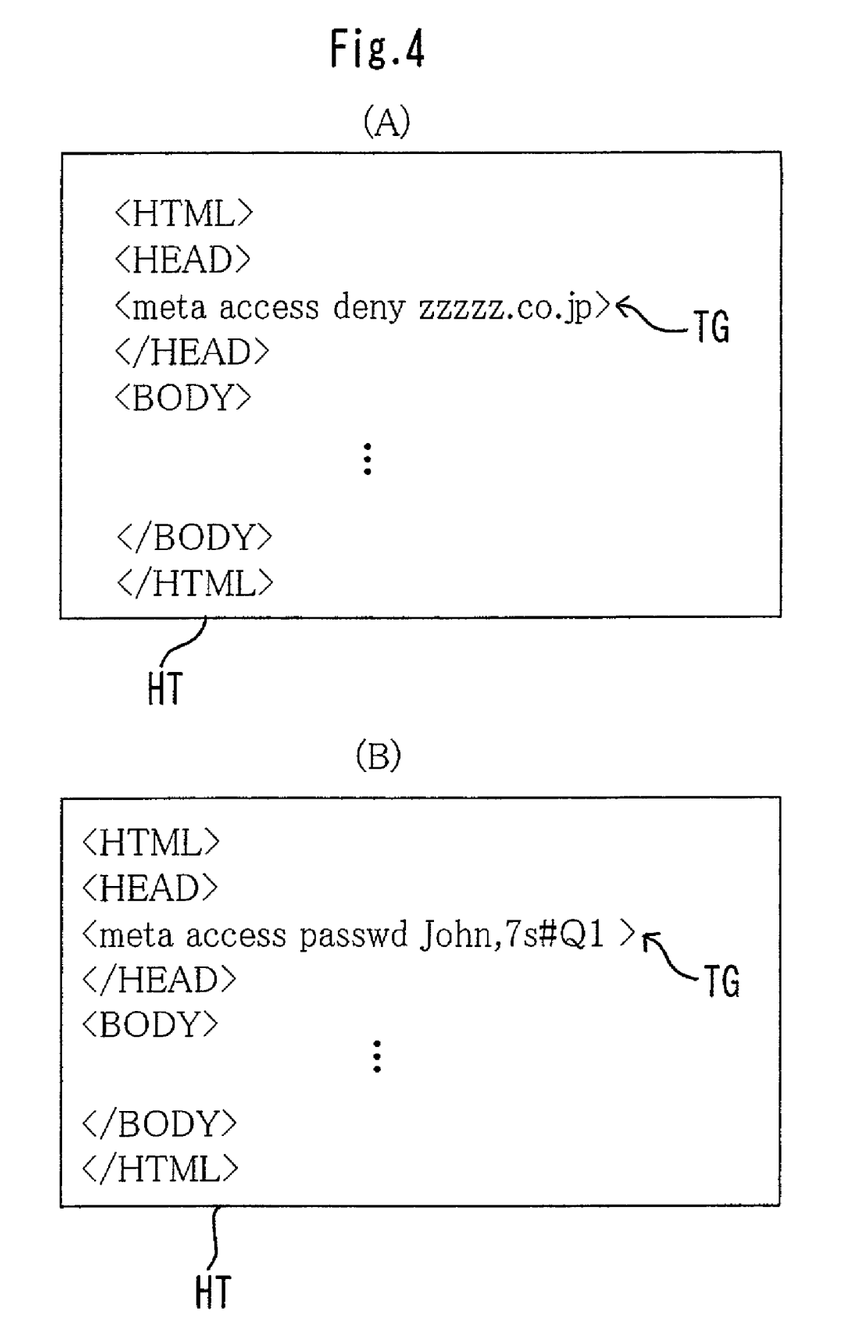
FIG. 4 is a diagram showing an example of a description of a hypertext.
Figure 5:
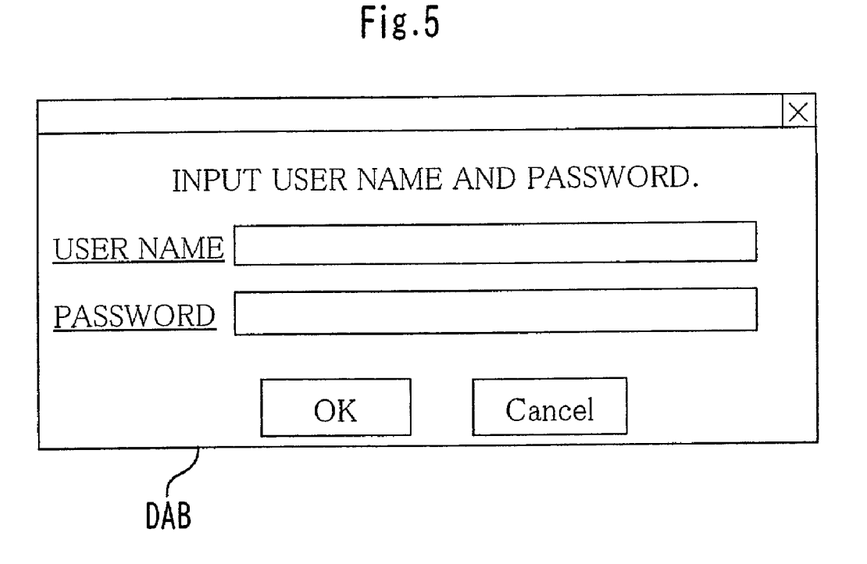
FIG. 5 is a diagram showing a dialog box for inputting a user name and a password.

FIG. 1 is a diagram explaining the Internet 1 and a WWW system 2. FIG. 2 is a diagram showing a screen HG1 of a WWW browser 22a1. FIG. 3 is a block diagram showing a functional structure of a WWW server 21 and a terminal device 22. FIG. 4 is a diagram showing an example of a description of a hypertext HT. FIG. 5 is a diagram showing a dialog box DAB for inputting a user name and a password.

As shown in FIG. 1, the Internet 1 comprises a communication line 11, a network server 12 that provides various services such as an electronic mail, net news, a file transfer or a WWW, a terminal device 13 that is a client for receiving these services and other various devices or systems.

The communication line 11 comprises a plurality of LANs 11a connected with each other or a public line that connects the terminal device 13 with the LAN 11a. A communication protocol TCP/IP is used for the Internet 1, and a communication protocol HTTP is used in the WWW system 2.

The WWW system 2 is an information providing system using a partial structure of the Internet 1. According to an aspect of the present invention, the WWW server 21 and the terminal device 22 function as the WWW browser.

The WWW server 21 comprises a server body 21a including a CPU, a RAM, a communication control unit and a magnetic disk drive 21H, a display device 21b and a keyboard 21c. The WWW server 21 is a network server 12 that transmits a hypertext HT responding to an access request from the terminal device 22.

The hypertext HT is a text file described in a language such as HTML or XML for displaying Web contents on the WWW browser. The information provider describes an information resource to be provided in a language such as the HTML for making a hypertext HT. In this example, the information provider can describe an access control tag TG as shown in FIG. 4 in the hypertext HT, so that the WWW server 21 can perform an access control to the hypertext HT. T The magnetic disk drive 21H stores an operating system and application programs necessary for realizing the functions of the WWW server 21 and a document database DBT including a set of the hypertexts HT to be provided for the terminal device 22. These programs or data are loaded in the RAM so that the CPU executes operation.

The terminal device 22 comprises a terminal device body 22a equipped with a CPU, a RAM and a communication device, a display device 22b, a keyboard 22c and a mouse 22d.

The WWW browser 22a1 is installed in the terminal device body 22a.

The WWW browser 22a1 requests the WWW server 21 for an access to the hypertext HT and downloads the hypertext HT. Alternatively, as the screen HG1 shown in FIG. 2, the WWW browser 22a1 displays Web contents for the user visually using characters or images in accordance with the hypertext HT.

In FIG. 2, the user of the terminal device body 22a operates the WWW browser 22a1 for requesting the access to the hypertext HT by inputting a URL of a desired hypertext HT in a text box BX or by clicking a hyperlink HL while viewing the screen HG1 displayed on the display device 22b.

A personal computer or a workstation can be used as the terminal device 22. Other devices having a WWW browser function such as a cellular phone, a PHS, a game machine or an interactive TV set can also be used.

Thus, the WWW server 21 and the terminal device 22 have the functions shown in FIG. 3.

As shown in FIG. 3, the WWW server 21 has functions of reception means 211, file searching means 212 and transmission control means 213.

The reception means 211 receives information concerning a request for the access from the terminal device 22 to the hypertext HT. The file searching means 212 searches a hypertext HT corresponding to the request from the document database DBT.

The transmission control means 213 comprises an access permission decision portion 213a, a file generating portion 213b and a file transmission portion 213c. The transmission control means 213 controls the transmission of the hypertext HT to the terminal device 22. The access permission decision portion 213a determines whether the access to thehypertext HT should be permitted or not in accordance with the access control tag TG included in the hypertext HT. For example, it is determined whether the hypertext HT should be transmitted to the terminal device 22 or not. The file generating portion 213b deletes the access control tag TG from the hypertext HT and generates a hypertext HT to be transmitted to the terminal device 22.

The file transmission portion 213c transmits a hypertext HT or a message of refusing the access to the requesting terminal device 22.

The communication control means 221 of the terminal device 22 performs transmission and reception with another device, such as a request for an access to the hypertext HT in accordance with the URL, or reception of the hypertext HT.

According to an aspect of the present invention, the access permission decision portion 213a, the hypertext HT and the access control tag TG are explained in further detail.

In FIG. 4, the hypertext HT is described in the HTML and includes an access control tag TG. The access control tag TG is defined in the HTML beforehand. The access permission decision portion 213a of the WWW server 21 determines whether the access to the hypertext HT should be permitted or not in accordance with the argument in the access control tag TG.

The access control tag "<meta access deny [domain 1], ..., [domain k]>" indicates that an access from a device belonging to the domain designated in the argument [domain k] is denied. Therefore, the access control tag "<meta access deny zzzzz.co.jp>" shown in FIG. 4A indicates that an access from a domain "zzzzz.co.jp" is denied.

The access control tag "<meta access deny [domain 1], ...,[domain k]>" indicates that an access from a device belonging to the domain designated in the argument [domain k] is permitted.

The access control tag "<meta access passwd [user name 1], [password 1], ..., [user name k], [password k]" indicates that the access is permitted when the user designated in the argument [user name k] inputs the password designated in [password k]. Therefore, if the user name or the password is not identical, the access is denied.

When the access control tag "<meta access passwd ... >" is included in the hypertext HT, the access permission decision portion 213a instructs the requesting terminal device 22 to display the dialog box DAB shown in FIG. 5 for the user. The user inputs the user name and the password in the dialog box DAB shown in FIG. 5. Therefore, the access control tag "<meta access passwd John, 7s#Q1" shown in FIG. 4B indicates the access is denied if the user name "John" and the password "7s#Q1" are not inputted.

Next, an example process of the access to a hypertext HT will be explained with reference to flowcharts.

Figure 6:
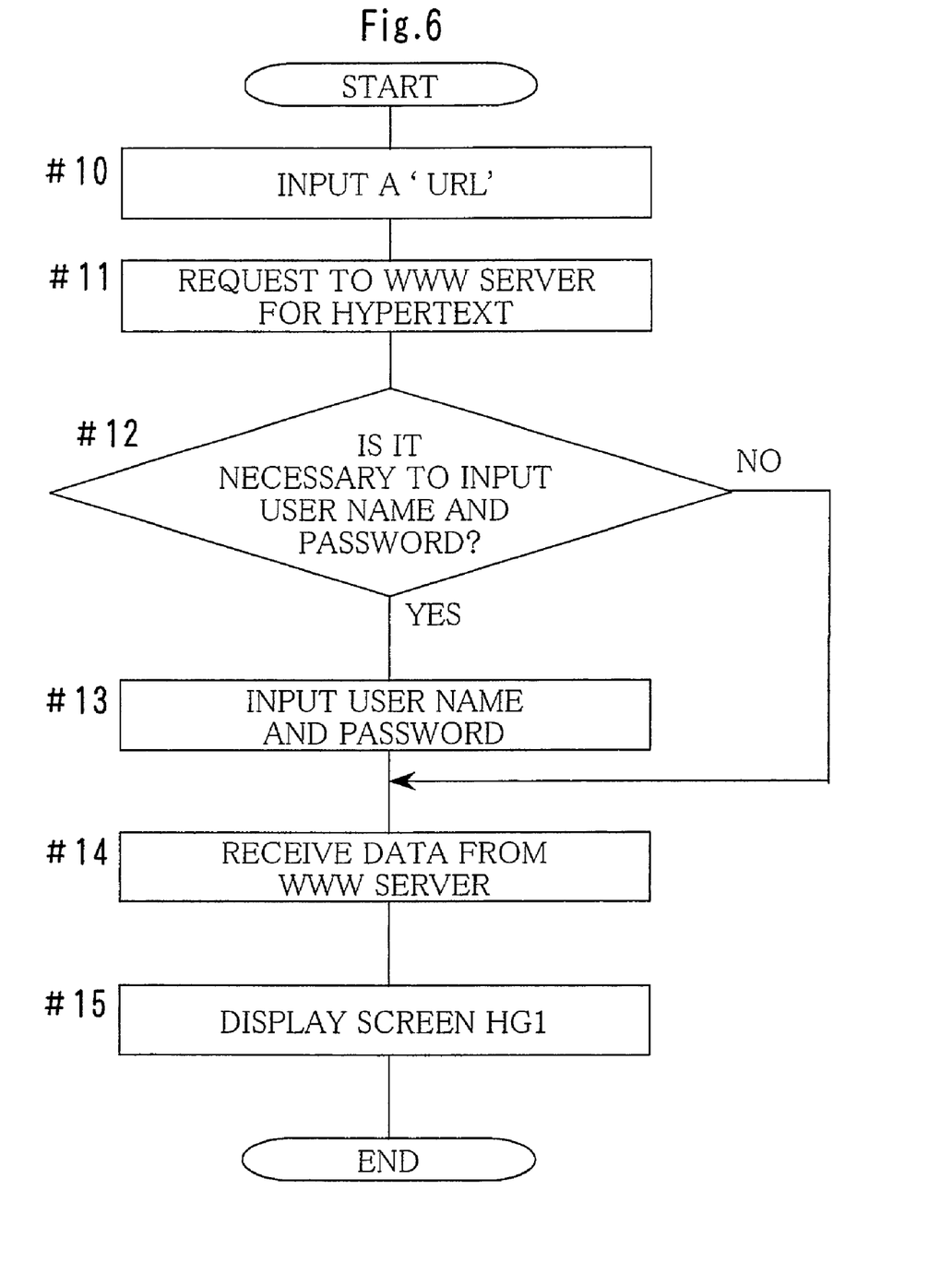
FIG. 6 is a flowchart showing a process of the terminal device.
Figure 7:
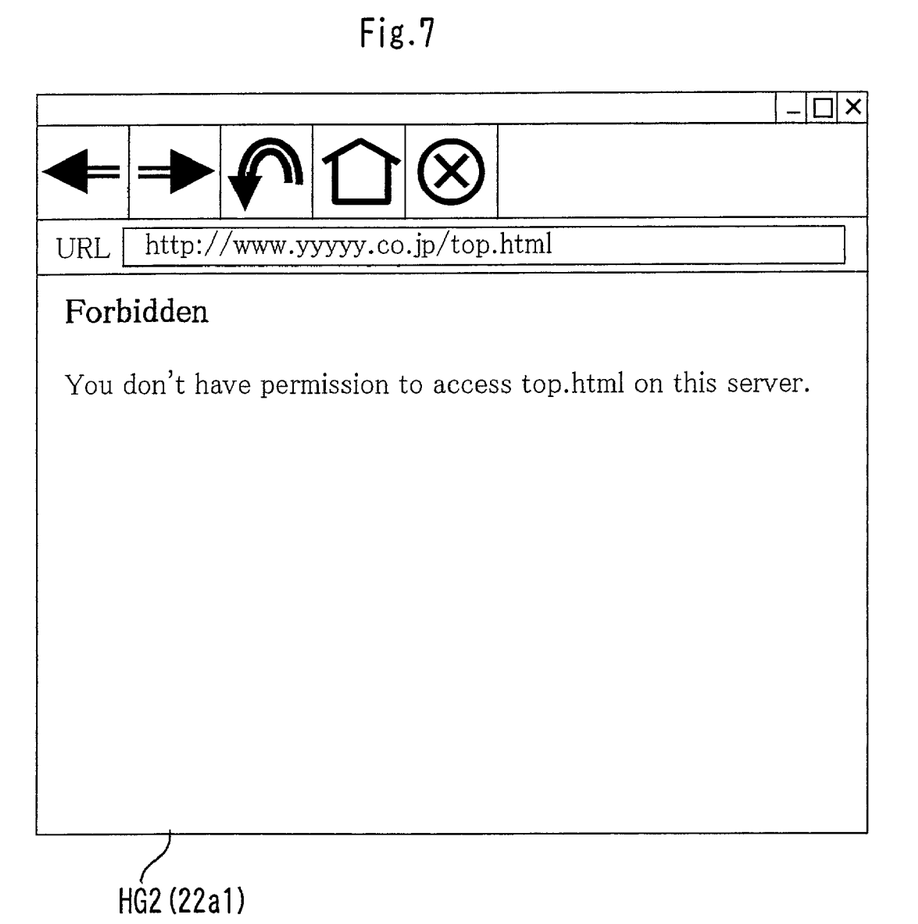
FIG. 7 is a diagram showing a screen of the WWW browser for displaying a message of denying the access.
Figure 8:
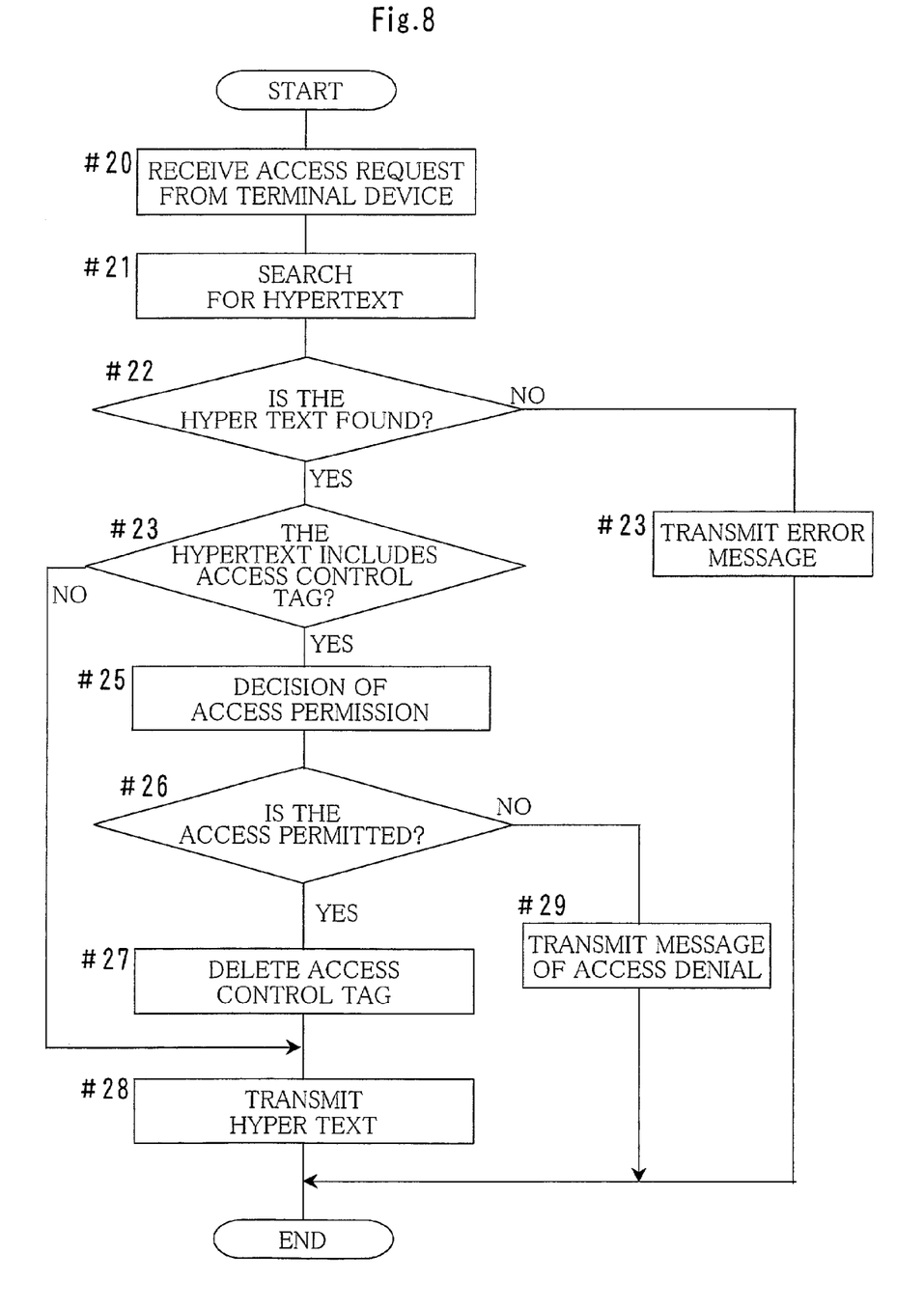
FIG. 8 is a flowchart showing a process of the WWW server.

FIG. 6 is a flowchart showing a process of the terminal device 22. FIG. 7 is a diagram showing a screen HG2 of the WWW browser 22a1 for displaying a message of denying the access. FIG. 8 is a flowchart showing a process of the WWW server 21.

As shown in FIG. 6, in the terminal device 22, a user designates a URL of a desired hypertext HT by the WWW browser 22a1 (#10). This request and information about the terminal device 22 are transmitted to the WWW server 21 designated in the URL via a DNS server or a relay server in the Internet 1 (#11).

When an input of a user name and a password is requested from the WWW server 21 (Yes in #12), the user inputs the user name and the password in the dialog box DAB to send them to the WWW server 21 (#13).

The hypertext HT or the message of denying the access is received from the WWW server 21 (#14). It The process performed by the WWW server 21 determines whether that the user receives the hypertext HT or the message.

The received hypertext HT or the message is displayed on the display device 22b (#15). If the desired hypertext HT is obtained, the screen HG1 as shown in FIG. 2 is displayed. When the access is denied, the WWW browser 22a1 displays a message indicating the denial as the screen HG2 shown in FIG. 7 for the user.

In FIG. 8, the WWW server 21 receives the request for accessing to the hypertext HT from the terminal device 22 (#20) and searches the corresponding hypertext HT (#21).

If the hypertext HT is not found (No in #22), an error message is transmitted to the terminal device 22 (#23), and the process is finished.

If the hypertext HT is found (Yes in #22), it is determined whether the hypertext HT includes an access control tag TG or not (#24).

If an access control tag TG is not included (No in #24), the hypertext HT is transmitted to the requesting terminal device 22 without delay (#28), and the process is finished. If an access control tag TG is included (Yes in #24), it is determined whether the access should be permitted in accordance with the access control tag TG (#25). For example, in a case of the hypertext HT shown in FIG. 4A, it is determined that a request for an access from the terminal device 22 belonging to the domain "zzzzz.co.jp" is denied, and a request for an access from others is permitted. In the case of the hypertext HT shown in FIG. 4B, a user name and a password are requested from the requesting terminal device 22, for determining whether the access should be permitted or not.

If the access is permitted (Yes in #26), the access control tag TG is deleted from the hypertext HT (#27), and the hypertext HT having no access control tag TG is transmitted to the terminal device 22 (#28). If the access is not permitted (No in #26), the message of denying the access is transmitted to the terminal device 22 (#29).

According to an example embodiment, an access control tag TG regarding an access control is directly described in a hypertext HT that is an information resource, thereby the access can be controlled for each hypertext HT easily and flexibly.

In addition, since the hypertext HT in which the access control tag TG is deleted is the hypertext HT that is transmitted to the terminal device 22, unauthorized disclosure regarding the access control can be prevented.

Moreover, since the access control tag TG is defined by a "meta" tag, the WWW browser 22a1 can display Web contents by skipping the access control tag TG when the hypertext HT is transmitted to the terminal device 22 without deleting the access control tag TG. Therefore, even if the access control tag TG is not deleted, contents of the access control tag TG are not easily disclosed by the user.

Furthermore, the domain to which the terminal device 22 belongs can be determined in accordance with the IP address instead of the domain address. In addition, it is also possible to define the access control tag TG for controlling the access in accordance with the type of the operating system or the WWW browser 22a1 that is used in the terminal device 22.

The access control tag TG can be defined by tags other than the tag "<meta access . . . >." The access control tag TG can be used in various languages other than the HTML or the XML.

Figure 9:
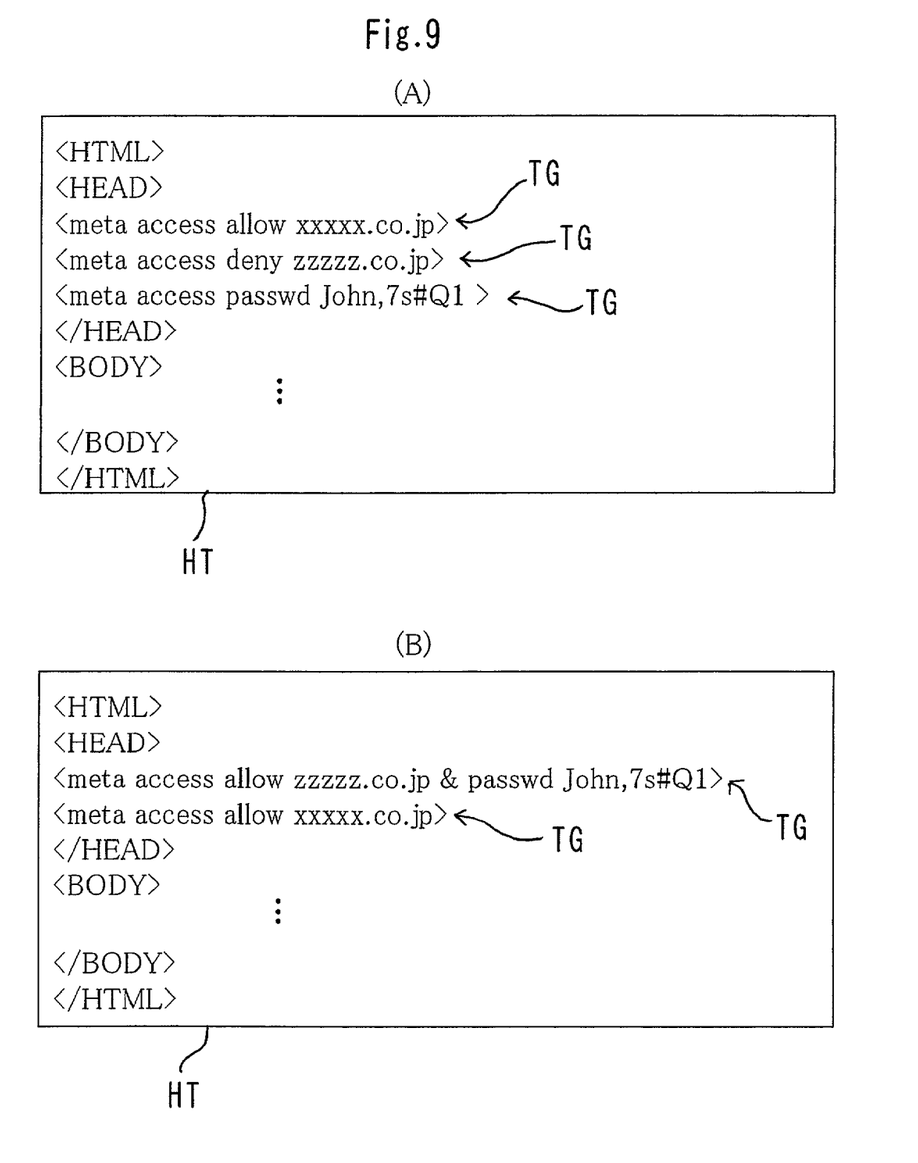
FIGS. 9A and 9B are diagrams showing combinations of access control tags.

FIGS. 9A and 9B are diagrams showing combinations of the access control tags TG.

By combining plural access control tags TG, a developed access control can be performed. For example, in the case of the combination shown in FIG. 9A, an access from the domain "xxxxx.co.jp" is permitted without any condition, while an access from the domain "zzzzz.co.jp" is denied. An access from a domain except the above-mentioned domains requires an input of a user name and a password.

In addition, two or more conditions can be assigned by using an AND operator "&" defined beforehand and by describing as "<meta access condition 1 & . . . & condition k>". For example, in the case of the combination shown in FIG. 9B, an access from the domain "zzzzz.co.jp" is required to input a user name and a password, while an access from the domain "xxxxx.co.jp" is permitted without other conditions.

Altough the WWW system 2 is provided on the Internet 1 in this example embodiment, it may also, for example, be provided on a local network such as an intranet.

Although this embodiment shows an example where the hypertext HT is recorded in the magnetic disk drive 21H, the hypertext HT can be recorded in other media, for example, a semiconductor memory such as a RAM or a ROM, a portable medium such as a CD-ROM, a floppy disk, a memory card or a magneto-optical disk. If the recording medium is a portable medium, the hypertext HT is read out by the drive corresponding to the type of the portable medium and is stored in a magnetic disk or other media, or is loaded on a main memory for processing.

A structure, process contents and process order in the whole or a part of the WWW system 2, the WWW server 21, or the terminal device 22, or a rule of the access control tag TG can be changed in the scope of the present invention.

According toaspects of the present invention, an easy and flexible access to information resources can be realized.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A network server for transmitting a hypertext to a client, comprising:
   a storage portion storing a first hypertext containing access permission information that is information concerning whether an access of the first hypertext is permitted;
   a request receiving portion receiving a request for the first hypertext from the client;
   a determining portion determining whether the first hypertext concerning the request can be transmitted in accordance with the access permission information contained in the first hypertext;
   a hypertext generating portion generating a second hypertext by removing the access permission information from the first hypertext when it is determined that the first hypertext concerning the request can be transmitted; and
   a hypertext transmitting portion transmitting the generated second hypertext to the client that made the request.

2. The network server according to claim 1, wherein
   the access permission information in the first hypertext indicates a client that is permitted to get access to the first hypertext, a client that is not permitted to get access to the same and a password, and
   the determining portion determines that the first hypertext can be transmitted if the access permission information contained in the first hypertext concerning the request indicates that the client that made the request is permitted to get access, determines that the first hypertext cannot be transmitted if the access permission information indicates that the client is refused to get access, and determines the first hypertext can be transmitted under the condition that a password entered by the client matches a password indicated in access permission information if the access permission information does not contain information about whether or not the client can get access.

3. A method for transmitting a hypertext to a client, the method comprising:
   storing a first hypertext containing access permission information that is information concerning whether an access of the first hypertext is permitted;
   receiving a request for the first hypertext from the client;
   determining whether the first hypertext concerning the request can be transmitted in accordance with the access permission information contained in the first hypertext;
   generating a second hypertext by removing the access permission information from the first hypertext when it is determined that the first hypertext concerning the request can be transmitted; and
   transmitting the generated second hypertext to the client that made the request.

4. The method according to claim 3, wherein the access permission information in the first hypertext indicates a client that is permitted to get access to the first hypertext, a client that is not permitted to get access to the same and a password, and
   the determining further comprises:
      determining that the first hypertext can be transmitted if the access permission information contained in the first hypertext concerning the request indicated that the client that made the request is permitted to get access,
      determining that the first hypertext cannot be transmitted if the access permission information indicates that the client is refused to get access, and
      determining that the first hypertext can be transmitted under the condition that a password entered by the client matches a password indicated in access permission information if the access permission information does not contain information about whether the client can get access.

5. A computer-readable storage storing a computer-readable program which controls a computer system to in transmitting a hypertext to a client, by:
 storing a first hypertext containing access permission information that is information concerning whether an access of the first hypertext is permitted:
 receiving a request for the first hypertext from the client;
 determining whether the first hypertext concerning the request can be transmitted in accordance with the access permission information contained in the first hypertext;
 generating a second hypertext by removing the access permission information from the first hypertext when it is determined that the first hypertext concerning the request can be transmitted; and
 transmitting the generated second hypertext to the client that made the request.

6. The computer-readable storage storing a computer-readable program which controls a computer system in transmitting a hypertext to a client according to claim 5, wherein the access permission information in the first hypertext indicates a client that is permitted to get access to the first hypertext, a client that is not permitted to get access to the same and a password, and
 the determining further comprises:
  determining that the first hypertext can be transmitted if the access permission information contained in the first hypertext concerning the request indicated that the client that made the request is permitted to get access,
  determining that the first hypertext cannot be transmitted if the access permission information indicates that the client is refused to get access, and
 determining that the first hypertext can be transmitted under the condition that a password entered by the client matches a password indicated in access permission information if the access permission information does not contain information about whether the client can get access.

* * * * *

UNITED STATES PATENT AND TRADEMARK OFFICE
CERTIFICATE OF CORRECTION

PATENT NO. : 7,043,554 B2
APPLICATION NO. : 09/812830
DATED : May 9, 2006
INVENTOR(S) : Tadashi Hasegawa

It is certified that error appears in the above-identified patent and that said Letters Patent is hereby corrected as shown below:

On the title page:

In Title (54), and Column 1, delete "NETWORKER" to --NETWORK--.

Signed and Sealed this

Twenty-eighth Day of November, 2006

JON W. DUDAS
*Director of the United States Patent and Trademark Office*